United States Patent
Wang et al.

(10) Patent No.: US 10,158,247 B2
(45) Date of Patent: Dec. 18, 2018

(54) SYSTEMS AND METHODS FOR ENABLING MULTIPLE BATTERY BACKUP UNITS IN A SYSTEM

(71) Applicant: Dell Products L.P., Round Rock, TX (US)

(72) Inventors: Ligong Wang, Austin, TX (US); Guangyong Zhu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 15/381,550

(22) Filed: Dec. 16, 2016

(65) Prior Publication Data

US 2018/0175664 A1   Jun. 21, 2018

(51) Int. Cl.
  *H02J 7/00* (2006.01)
  *H02J 9/00* (2006.01)
  *H02J 9/06* (2006.01)

(52) U.S. Cl.
  CPC ............ *H02J 9/061* (2013.01); *H02J 7/0068* (2013.01)

(58) Field of Classification Search
  CPC .. H02J 7/0068; H02J 9/061; H02J 7/00; H02J 9/06
  USPC .......................................................... 307/66
  See application file for complete search history.

(56) References Cited

U.S. PATENT DOCUMENTS

| 4,949,028 | A | 8/1990 | Brune |
| 6,049,141 | A | 4/2000 | Sieminski et al. |
| 6,208,039 | B1 | 3/2001 | Mendelsohn et al. |
| 7,589,498 | B2 * | 9/2009 | Choy ...................... H02J 1/102 320/119 |
| 7,732,944 | B2 | 6/2010 | Hirsch et al. |
| 8,111,039 | B2 | 2/2012 | Bayne et al. |
| 8,164,305 | B2 | 4/2012 | Zhang et al. |
| 8,344,694 | B2 | 1/2013 | Zhang et al. |
| 2009/0230922 | A1 | 9/2009 | Elder et al. |
| 2009/0295336 | A1 | 12/2009 | Yang |
| 2015/0067362 | A1 * | 3/2015 | Sultenfuss ............ G06F 1/3296 713/320 |
| 2017/0018941 | A1 | 1/2017 | Wang et al. |

* cited by examiner

*Primary Examiner* — Rexford Barnie
*Assistant Examiner* — Toan Vu
(74) *Attorney, Agent, or Firm* — Jackson Walker L.L.P.

(57) ABSTRACT

A battery backup unit for supplying electrical energy in response to a power event affecting an ability of a power supply unit to deliver electrical energy may be configured to, in response to the power event, generate a regulated output voltage having a first voltage magnitude for a first period of time to limit power generated by the battery backup unit to a first power magnitude during the first period of time, and after the first period of time, generate the output voltage having a second voltage magnitude lesser than the first voltage magnitude for a second period of time to limit power generated by the battery backup unit to a second power magnitude lesser than the first power magnitude, wherein the second power magnitude is a function of a continuous maximum power supported by the battery backup unit based on characteristics of the battery backup unit.

15 Claims, 2 Drawing Sheets

_US 10,158,247 B2_

SYSTEMS AND METHODS FOR ENABLING MULTIPLE BATTERY BACKUP UNITS IN A SYSTEM

TECHNICAL FIELD

The present disclosure relates in general to information handling systems, and more particularly to systems and methods for enabling multiple battery backup units in a system without active current sharing support.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to operate from an input alternating current (AC) source of electrical energy, which the power supply unit converts to a direct current (DC) output. Thus, typically a power supply unit may include a rectifier and/or power factor correction stage to receive the input AC source and rectify the input AC waveform to charge a bulk capacitor to a desired voltage. A direct-current-to-direct-current (DC-DC) stage may convert the voltage on the bulk capacitor to a DC output voltage which may be used to power components of the information handling system.

A battery backup unit may be capable of, immediately after removal of the AC source to the power supply unit, providing electrical energy at its output for a period of time using stored charge within battery cells to provide an output direct-current voltage to allow for data to be saved or additional computing to take place. Such a period of time is limited, of course, as once the alternating current input is not available, the battery backup unit will discharge over time and the power supply unit will shutdown.

In many implementations, a chassis will include multiple information handling system sleds each with its own battery backup unit for providing power to on-sled loads of the information handling system (e.g., non-volatile memory, baseboard management controllers, remote access controllers, etc.) for a period of time as well as providing energy for powering chassis-level components such as chassis fans. Uneven sharing of current or power of the various battery backup units within a chassis can cause one battery backup unit to discharge more significantly than others. Thus, in a data-saving period required by components of an information handling system sled (e.g., non-volatile memory), the battery backup unit of such information handling system sled may drop below an expected state of charge, meaning such battery backup unit may not be able to support the system (e.g., supporting multiple alternating current power events).

Two approaches are typically used to solve current imbalance issues: active current sharing and passive current sharing. Active sharing often requires complicated communication, coordination, and control among battery backup units, which in turn requires complicated hardware and firmware design and support. Passive sharing is generally much simpler to implement, but traditional approaches to passive sharing are limited in effectiveness.

Any current sharing imbalance can create additional problems when an information handling system requires a higher amount of power neat the beginning of an alternating current power loss and lower power during a persistent memory save process. Such problems may be solved by battery backup units supporting higher charging capacities or the adjustment of maximum current settings, but such solutions are often costly or complex, and thus, undesirable.

SUMMARY

In accordance with the teachings of the present disclosure, the disadvantages and problems associated with existing approaches to enabling the use of multiple battery backup units in a system may be reduced or eliminated.

In accordance with embodiments of the present disclosure, an information handling system may include an information handling resource, a power input for receiving electrical energy for powering the information handling resource via a power bus, and a battery backup unit for supplying electrical energy to the information handling resource via the power bus in response to a power event affecting an ability of a power supply unit to deliver electrical energy to the power bus. The battery backup unit may be configured to, in response to the power event, generate a regulated output voltage having a first voltage magnitude for a first period of time to limit power generated by the battery backup unit to a first power magnitude during the first period of time, and after the first period of time, generate the output voltage having a second voltage magnitude lesser in magnitude than the first voltage magnitude for a second period of time to limit power generated by the battery backup unit to a second power magnitude lesser in magnitude than the first power magnitude during the first period of time, wherein the second power magnitude is a function of a continuous maximum power supported by the battery backup unit based on characteristics of the battery backup unit.

In accordance with these and other embodiments of the present disclosure, a battery backup unit for supplying electrical energy to an information handling resource via a power bus in response to a power event affecting an ability of a power supply unit to deliver electrical energy to the information handling resource via the power bus, may be configured to, in response to the power event generate a regulated output voltage having a first voltage magnitude for a first period of time to limit power generated by the battery backup unit to a first power magnitude during the first period of time, and after the first period of time, generate the output voltage having a second voltage magnitude lesser in magnitude than the first voltage magnitude for a second period of time to limit power generated by the battery backup unit to a second power magnitude lesser in magnitude than the first power magnitude during the first period of time, wherein the second power magnitude is a function of a continuous maximum power supported by the battery backup unit based on characteristics of the battery backup unit.

In accordance with these and other embodiments of the present disclosure, a method may include, in a system comprising a battery backup unit for supplying electrical energy to an information handling resource via a power bus in response to a power event affecting an ability of a power supply unit to deliver electrical energy to the information handling resource via the power bus, in response to the power event: generating a regulated output voltage having a first voltage magnitude for a first period of time to limit power generated by the battery backup unit to a first power magnitude during the first period of time, and after the first period of time, generating the output voltage having a second voltage magnitude lesser in magnitude than the first voltage magnitude for a second period of time to limit power generated by the battery backup unit to a second power magnitude lesser in magnitude than the first power magnitude during the first period of time, wherein the second power magnitude is a function of a continuous maximum power supported by the battery backup unit based on characteristics of the battery backup unit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
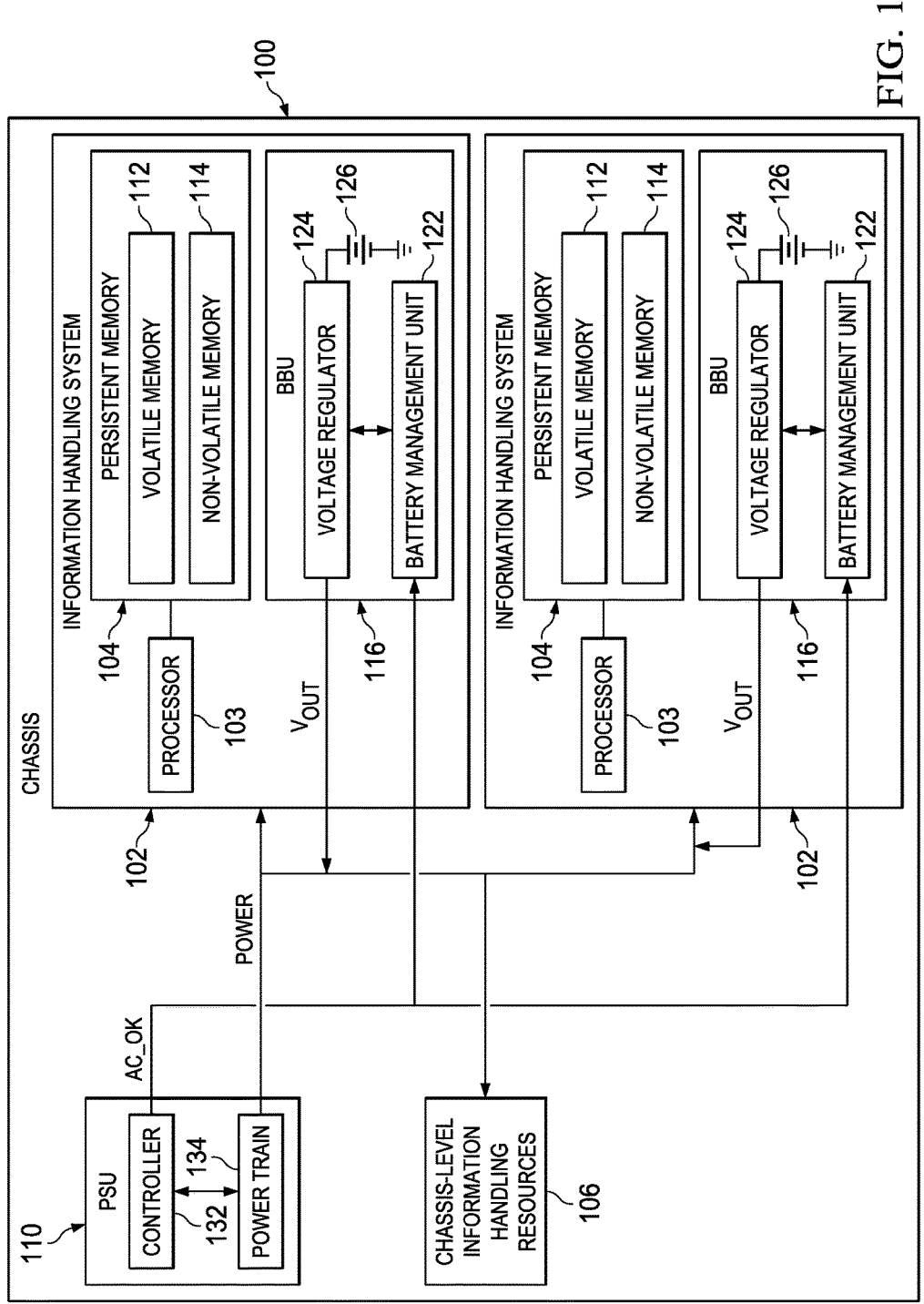
FIG. 1 illustrates a block diagram of an example chassis comprising multiple modular information handling systems, in accordance with embodiments of the present disclosure.
Figure 2:
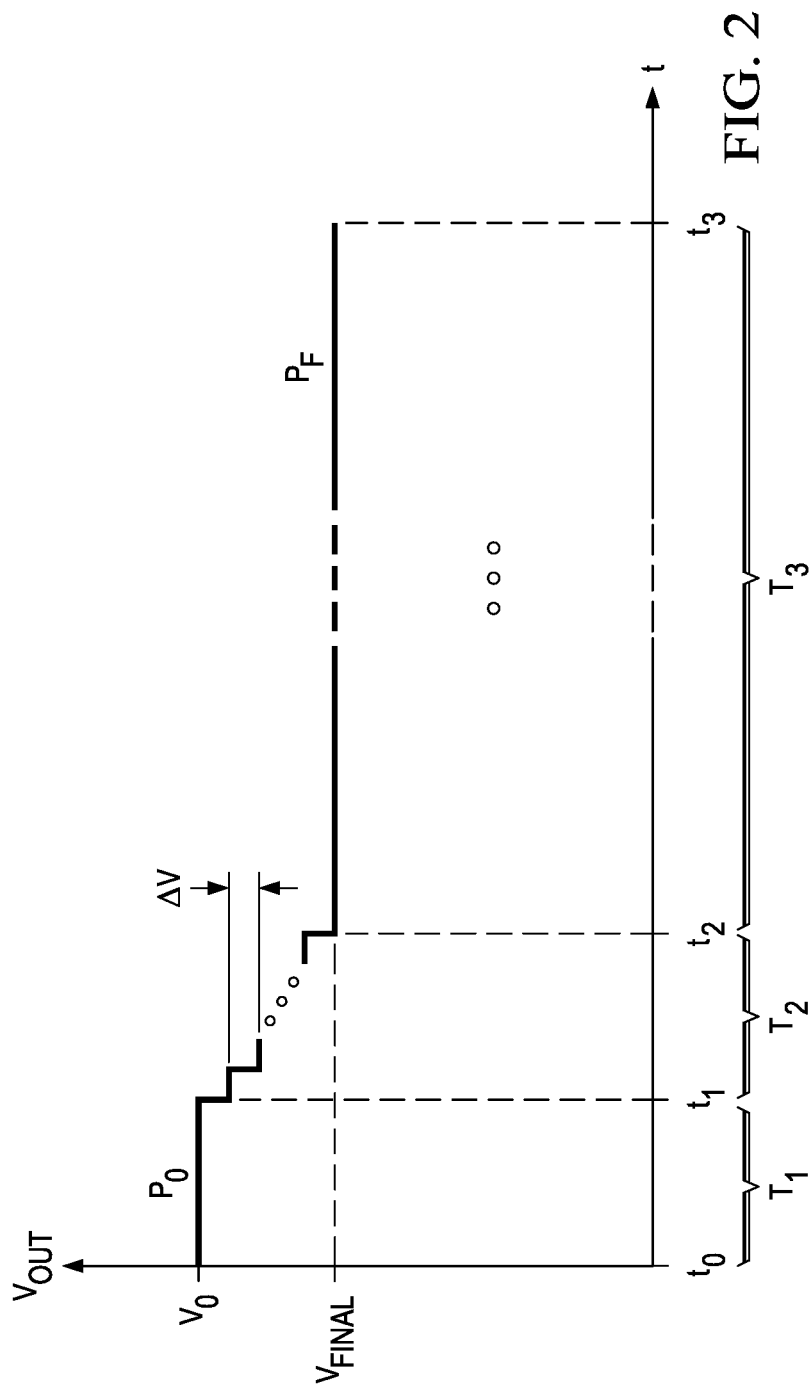
FIG. 2 illustrates a graph of voltage versus time demonstrating battery backup unit functionality in response to an alternating current power source event, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example chassis 100 comprising multiple modular information handling systems 102. Chassis 100 may comprise an enclosure that serves as a container for various information handling systems 102 and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems 102 and/or information handling resources. As depicted in FIG. 1, chassis 100 may include a plurality of information handling systems 102, one or more power supply units (PSUs) 110, and one or more chassis-level information handling resources 106.

As depicted, an information handling system 102 may include a processor 103, a persistent memory 104 communicatively coupled to processor 103, a battery backup unit (BBU) 116, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in persistent memory 104 and/or another component of information handling system 102.

Persistent memory 104 may be communicatively coupled to processor 103 and may comprise any system, device, or apparatus operable to retain program instructions or data for a period of time. Persistent memory 104 may comprise random access memory (RAM), electrically erasable programmable read-only memory (EEPROM), a PCMCIA card, flash memory, magnetic storage, opto-magnetic storage, or any suitable selection and/or array of volatile memory or non-volatile memory configured to retain data after power is withdrawn from information handling system 102. As shown in FIG. 1, persistent memory 104 may include a volatile memory 112 (e.g., DRAM or other volatile random-access memory) and a non-volatile memory 114 (e.g., flash memory or other non-volatile memory). During normal operation, when PSUs 110 provide adequate power to components of information handling system 102, data written to persistent memory 104 from processor 103 may be stored in volatile memory 112. However, in the event of loss of system input power or a power fault of one or more PSUs 110 that prevents delivery of electrical energy from PSUs 110 to memory 104, data stored in volatile memory 112 may be transferred to non-volatile memory 114 in a save operation. After input power is restored, or a faulty PSU 110 is replaced, such that PSUs 110 are again operable to provide electrical energy to information handling resources of information handling system 102, on the subsequent power-on of information handling system 102, data may be copied from the non-volatile memory 114 back to volatile memory 112 via a restore operation. The combined actions of data save and then data restore, allows the data to remain persistent through a power disruption. Accordingly, although not explicitly shown in FIG. 1, persistent memory 104 may also include hardware, firmware, and/or software for carrying out such save operations.

A BBU 116 may include any system, device, or apparatus configured to supply electrical current to one or more information handling resources of an information handling system 102. For example, a BBU 116 may be configured to store energy which may be used by persistent memory 104 to perform save operations in response to a loss of system input power source (e.g., alternating current input source) or power fault of one or more PSUs 110.

As shown in FIG. 1, a BBU 116 may include a battery management unit 122, a voltage regulator 124, and one or more battery cells 126. Voltage regulator 124 of BBU 116 may be coupled at its outputs to a power bus (labeled "POWER" in FIG. 1) configured to, in response to a fault of PSU 110, deliver electrical energy to components of information handling system 102 and chassis-level information handling resources 106 of chassis 100. In some embodiments, in the event of a fault of PSU 110, PSU 110 may de-assert a signal (labeled AC_OK in FIG. 1) indicating a fault by PSU 110 (e.g., loss of its respective alternating current input sources). Furthermore, such signal or a derivative thereof may be communicated to batter management units 122 of BBUs 116, causing BBUs 116 to activate from a deactivated state to supply electrical current to the power bus.

Battery management unit 122 may comprise a microprocessor, DSP, ASIC, FPGA, EEPROM, or any combination thereof, or any other device, system, or apparatus for controlling operation of BBU 116. As such, battery management unit 122 may comprise firmware, logic, and/or data for controlling functionality of BBU 116.

Voltage regulator 124 may include any suitable system, device, or apparatus for converting electrical energy received by BBU 116 from battery cells 126 or other energy storage device (e.g., a capacitor) into electrical energy usable to information handling resources of information handling system 102 (e.g., 12-volt direct current voltage source). Accordingly, in some embodiments, voltage regulator 124 may comprise a direct-current-to-direct-current converter (e.g., a boost converter or buck converter). In operation, a voltage regulator 124 may deliver an amount of electrical current to the power bus in accordance with a control signal communicated from battery management unit 122 indicative of a desired amount of electrical current to be delivered.

In addition to processor 103, persistent memory 104, and BBU 116, an information handling system 102 may include one or more other information handling resources.

Generally speaking, PSU 110 may include any system, device, or apparatus configured to supply electrical current to information handling systems 102 and/or chassis-level information handling resources 106 of chassis 100. For example, in some embodiments, PSU 110 may drive electrical current to a power bus from which information handling systems 102 and/or chassis-level information handling resources 106 of chassis 100 draw electrical energy for operation.

As shown in FIG. 1, PSU 110 may include a controller 132 and a power train 134. Power train 134 of PSU 110 may be coupled at its outputs to a power bus (labeled "POWER" in FIG. 1) configured to information handling system 102 and chassis-level information handling resources 106.

Controller 132 may comprise a microprocessor, DSP, ASIC, FPGA, EEPROM, or any combination thereof, or any other device, system, or apparatus for controlling operation of PSU 110. As such, controller 132 may comprise firmware, logic, and/or data for controlling functionality of PSU 110.

Power train 134 may include any suitable system, device, or apparatus for converting electrical energy received by PSU 110 (e.g., a 120-volt alternating current or 240-volt alternating current voltage waveform) from an input source into electrical energy usable to information handling resources of information handling system 102 (e.g., 12-volt direct current voltage source). In some embodiments, power train 134 may comprise a rectifier, a power factor correction circuit, and/or a direct-current-to-direct-current converter. In these and other embodiments, power train 134 may comprise a voltage regulator (e.g., a multi-phase voltage regulator). In operation, a power train 134 may deliver an amount of electrical current to the power bus in accordance with a control signal communicated from controller 132 indicative of a desired amount of electrical current to be delivered.

Chassis-level information handling resources 106 may include a component system, device or apparatus of an chassis, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system. For example, in some embodiments, chassis-level information handling resources 106 may comprise infrastructure components of chassis 100 that are shared or used by one or more information handling systems 102 (e.g., cooling fans).

In addition to information handling systems 102, PSUs 110, and chassis-level information handling resources 106, chassis 100 may include one or more other information handling resources. For example, although FIG. 1 depicts chassis 100 having two information handling systems 102, in some embodiments chassis 100 may include a plurality of information handling systems 102. As a further example, although FIG. 1 depicts chassis 100 having only one PSU 110, in some embodiments chassis 100 may include a plurality of PSUs 110.

As described above, one or more BBUs 116 may provide power to support additional computing by information handling systems 102 and or chassis-level information handling resources in response to a power fault relating to PSU 110 (e.g., loss of alternating current power source to PSU 110). When providing such power, battery management unit 122, voltage regulator 124, and/or other components of BBU 116 may operate to regulate the output voltage $V_{OUT}$ at the output terminals of a BBU 116.

Typically, the maximum amount of power that may be output by a BBU 116 may be limited by characteristics of BBU 116, such as, for example, battery type, battery chemistry (e.g., chemicals within battery used to store electrochemical energy), and battery ratings. If a BBU 116 is continually discharged above its maximum power rating, the life (e.g., amount of time in which BBU 116 may provide useful power at its output) may be critically reduced. However, if a BBU 116 is discharged above its maximum power rating for a relatively short period of time, such over power condition may have a largely negligible effect on battery life.

In many instances, it is not uncommon that components within a chassis 100 (e.g., information handling systems 102 and chassis-level information handling resources 106) may require a relatively large amount of power immediately after a power fault of PSU 110 for a short period of time, while requiring a lower level of power after such short period of time. In traditional approaches, a BBU 116 may have challenges in supporting such multi-level power requirements, for example if voltage reduction is required for current sharing.

To overcome these challenges, in accordance with embodiments of the present disclosure, operation of a BBU 116 in response to an alternating current power event may be understood by reference to FIG. 2. FIG. 2 illustrates a graph of voltage $V_{OUT}$ generated by a BBU 116 versus time t demonstrating battery backup unit functionality in response to an alternating current power source event, in accordance with embodiments of the present disclosure. During a first time period $T_1$ from a time $t_0$ to a time $t_1$ (e.g., one second) occurring after an alternating current power source event at approximately time $t_0$, a battery management unit 122 may cause its BBU 116 to output a voltage $V_0$ (e.g., 9.8 volts) in order to provide high power requirements (e.g., a power level $P_0$) for components of chassis 100 for the time period $T_1$. During a period $T_2$ from time $t_1$ to a time $t_2$, a battery management unit 122 may cause its BBU 116 to decrease its output voltage $V_{OUT}$ in one or more voltage steps $\Delta V$ until BBU 116 generates an output voltage $V_{OUT}$ equal to a steady-state voltage $V_{FINAL}$ in order to limit output power to a maximum steady state power (e.g., a power level $P_F$) which is based on characteristics of the BBU 116 indicative of its energy capacity (e.g., maximum power rating, battery type, battery chemistry, battery state of charge, etc.). Accordingly, BBU 116 may be able to generate the maximum steady-state power $P_F$ for a period of time $T_3$ from time $t_2$ to a time $t_3$ required by components of information handling system 102 (e.g., persistent memory 104) to perform tasks required for a graceful shutdown (e.g., completion of a save operation).

To simplify operation, battery management unit 122 and voltage regulator 124 may, while modifying output voltage $V_{OUT}$ from voltage $v_0$ to voltage $v_{FINAL}$, maintain a constant current mode of BBU 116.

In some embodiments, period $T_2$ may not be used, in which case voltage $V_{OUT}$ generated by BBU 116 may be reduced substantially immediately from voltage $V_0$ to voltage $V_{FINAL}$ at the end of time period $T_1$. Further, in embodiments in which the maximum steady-state power equals or exceeds the power required by chassis 100 during time period $T_1$, BBU 116 may not reduce output voltage $V_{OUT}$ after time period T1 (e.g., $\Delta V$=0).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    an information handling resource;
    a power input for receiving electrical energy for powering the information handling resource via a power bus; and
    a battery backup unit for supplying electrical energy to the information handling resource via the power bus in response to a power event affecting an ability of a power supply unit to deliver electrical energy to the power bus, the battery backup unit configured to, in response to the power event:
        generate a regulated output voltage having a first voltage magnitude for a first period of time to limit power generated by the battery backup unit to a first power magnitude during the first period of time; and
        after the first period of time, generate the output voltage having a second voltage magnitude lesser in magnitude than the first voltage magnitude for a second period of time to limit power generated by the battery backup unit to a second power magnitude lesser in magnitude than the first power magnitude during the first period of time, wherein the second power magnitude is a function of a continuous maximum power supported by the battery backup unit based on characteristics of the battery backup unit.

2. The information handling system of claim 1, wherein the information handling resource is a persistent memory, and the second period of time is a time sufficient for the persistent memory to perform a save operation.

3. The information handling system of claim 1, wherein the battery backup unit is further configured to decrease the output voltage in a plurality of steps from the first voltage magnitude to the second voltage magnitude during a third period of time intermediate to the first period of time and the second period of time.

4. The information handling system of claim 1, wherein the second period of time is a time sufficient for the information handling resource to perform a graceful shutdown.

5. The information handling system of claim 1, wherein the second period of time is a time sufficient for the information handling resource to perform a memory save operation.

6. A battery backup unit for supplying electrical energy to an information handling resource via a power bus in response to a power event affecting an ability of a power supply unit to deliver electrical energy to the information handling resource via the power bus, the battery backup unit configured to, in response to the power event:
generate a regulated output voltage having a first voltage magnitude for a first period of time to limit power generated by the battery backup unit to a first power magnitude during the first period of time; and
after the first period of time, generate the output voltage having a second voltage magnitude lesser in magnitude than the first voltage magnitude for a second period of time to limit power generated by the battery backup unit to a second power magnitude lesser in magnitude than the first power magnitude during the first period of time, wherein the second power magnitude is a function of a continuous maximum power supported by the battery backup unit based on characteristics of the battery backup unit.

7. The battery backup unit of claim 6, wherein the information handling resource is a persistent memory, and the second period of time is a time sufficient for the persistent memory to perform a save operation.

8. The battery backup unit of claim 6, wherein the battery backup unit is further configured to decrease the output voltage in a plurality of steps from the first voltage magnitude to the second voltage magnitude during a third period of time intermediate to the first period of time and the second period of time.

9. The battery backup unit of claim 6, wherein the second period of time is a time sufficient for the information handling resource to perform a graceful shutdown.

10. The battery backup unit of claim 6, wherein the second period of time is a time sufficient for the information handling resource to perform a memory save operation.

11. A method comprising, in a system comprising a battery backup unit for supplying electrical energy to an information handling resource via a power bus in response to a power event affecting an ability of a power supply unit to deliver electrical energy to the information handling resource via the power bus, in response to the power event:
generating a regulated output voltage having a first voltage magnitude for a first period of time to limit power generated by the battery backup unit to a first power magnitude during the first period of time; and
after the first period of time, generating the output voltage having a second voltage magnitude lesser in magnitude than the first voltage magnitude for a second period of time to limit power generated by the battery backup unit to a second power magnitude lesser in magnitude than the first power magnitude during the first period of time, wherein the second power magnitude is a function of a continuous maximum power supported by the battery backup unit based on characteristics of the battery backup unit.

12. The method of claim 11, wherein the information handling resource is a persistent memory, and the second period of time is a time sufficient for the persistent memory to perform a save operation.

13. The method of claim 11, further comprising decreasing, by the battery backup unit, the output voltage in a plurality of steps from the first voltage magnitude to the second voltage magnitude during a third period of time intermediate to the first period of time and the second period of time.

14. The method of claim 11, wherein the second period of time is a time sufficient for the information handling resource to perform a graceful shutdown.

15. The method of claim 11, wherein the second period of time is a time sufficient for the information handling resource to perform a memory save operation.

* * * * *